(12) United States Patent
Ihata et al.

(10) Patent No.: US 7,183,677 B2
(45) Date of Patent: Feb. 27, 2007

(54) AUTOMOTIVE ALTERNATOR HAVING RECTIFIER MOUNTED ON HEATSINK PLATE WITH COOLING FINS

(75) Inventors: Kouichi Ihata, Okazaki (JP); Shigenobu Nakamura, Anjo (JP); Motoki Ito, Obu (JP); Masatoshi Koumura, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/417,120

(22) Filed: May 4, 2006

(65) Prior Publication Data

US 2006/0192446 A1    Aug. 31, 2006

Related U.S. Application Data

(62) Division of application No. 10/620,443, filed on Jul. 17, 2003, now Pat. No. 7,067,947.

(30) Foreign Application Priority Data

Aug. 30, 2002  (JP) .............................. 2002-253770
Mar. 31, 2003  (JP) .............................. 2003-96381

(51) Int. Cl.
  H02K 9/06      (2006.01)
  H02K 11/04     (2006.01)
  H02K 5/18      (2006.01)
  H02K 5/20      (2006.01)
(52) U.S. Cl. ...................... 310/62; 310/60 R; 310/68 D
(58) Field of Classification Search ................. 310/58, 310/61, 60 A, 64, 68 D, 71, 52, 60 R, 62
See application file for complete search history.

(56) References Cited

U.S. PATENT DOCUMENTS

| | | | |
|---|---|---|---|
| 3,538,362 A | 11/1970 | Cheetham et al. | |
| 4,841,182 A | 6/1989 | Tsuchiya et al. | |
| 5,682,070 A | 10/1997 | Adachi et al. | |
| 5,710,467 A | 1/1998 | Irie et al. | |
| 5,729,063 A | 3/1998 | Adachi et al. | |
| 5,757,096 A | 5/1998 | DuBois et al. | |
| 5,883,450 A | 3/1999 | Abadia et al. | |
| 5,949,166 A | 9/1999 | Ooiwa et al. | |
| 6,184,602 B1 | 2/2001 | Ooiwa et al. | |
| 2003/0178899 A1 | 9/2003 | Aeschlimann et al. | |

FOREIGN PATENT DOCUMENTS

| | | |
|---|---|---|
| DE | 101 16 628 A 1 | 1/2002 |
| EP | 0 720 273 B1 | 11/1999 |
| JP | A-58-172961 | 10/1983 |
| JP | A 08-182279 | 7/1996 |
| JP | A 11-164538 | 6/1999 |
| JP | 2001-037142 | 2/2001 |
| JP | A 2001-169510 | 6/2001 |

Primary Examiner—Darren Schuberg
Assistant Examiner—David W. Scheuermann
(74) Attorney, Agent, or Firm—Oliff & Berridge, PLC

(57) ABSTRACT

A rotor and a stator are contained in a housing composed of front and rear frames, and a rectifier is mounted on the rear frame and covered with a rear cover having axial and radial openings. A minus heatsink plate having cooling fins extending in the axial direction is disposed to face the radial openings, forming radial air passages, and another air passage is formed between the minus heatsink plate and the rear frame. Cooling air introduced from the radial openings flows through the cooling fins and through the passage between the minus heatsink plate and the rear frame. Thus, efficiency for cooling the rectifier is enhanced.

8 Claims, 10 Drawing Sheets

FRONT SIDE ←→ REAR SIDE

AUTOMOTIVE ALTERNATOR HAVING RECTIFIER MOUNTED ON HEATSINK PLATE WITH COOLING FINS

This is a Divisional of U.S. patent application Ser. No. 10/620,443 filed Jul. 17, 2003, now U.S. Pat. No. 7,067,947, which is hereby incorporated by reference in its entirety. This application claims priority to Japanese Patent Application No. 2002-253770 filed Aug. 30, 2002, and Japanese Patent Application No. 2003-96381 filed Mar. 31, 2003, which are hereby incorporated by reference in their entirety.

BACKGROUND OF THE INVENTION

1. Field of the Invention

The present invention relates to an alternator (an alternating current generator) for use in an automotive vehicle.

2. Description of Related Art

An engine compartment size is becoming smaller in a recent vehicle to employ a so-called slant-nose design and to secure a sufficient space for a passenger compartment. There is a tendency that temperature in the congested engine compartment becomes high. In addition, a higher output of an alternator is required to fulfill power consumption in various electric and electronic devices although an idling rotational speed of the alternator is becoming lower to improve fuel economy. Under these circumstances, it is unavoidable that a temperature rise in the alternator becomes higher, especially in a rectifier that converts alternating current to direct current. Therefore, it is required to efficiently cool the rectifier in a limited space.

Because of the slant-nose design, a possibility that water splashed by tires or foreign particles enter into the engine compartment becomes high. Especially in cold seasons, salt water for melting snow splashed by tires reaches the alternator. In addition, cleanser liquid used in a car-wash may reach and enter the alternator.

To enhance the efficiency in cooling the rectifier, JP-A-11-164538 proposes to provide a radial air passage to directly blow cooling air to a heatsink plate of a rectifier, which is located far from a usual cooling air inlet port. Further, JP-A-2001-169510 discloses a rectifier heatsink plate having cooling fins formed thereon and through-holes for introducing cooling air.

Though the radial air passage proposed by JP-A-11-164538 improves the cooling efficiency to a certain extent, the radial passage alone is not sufficient to cope with a temperature rise that is becoming higher and higher in recent high power alternators. It may be possible to further improve the cooling efficiency by enlarging the heatsink plate size. However, such a countermeasure is contradictory to a requirement for reducing the alternator size. Though the cooling fins proposed by JP-A-2001-169510 help improve the cooling efficiency, the cooling fins standing on a pair of heatsinks overlapping each other make the axial length of the rectifier longer. This is also against the requirement for down-sizing. In both of the prior publications referred to above, no countermeasure against the splash of water or cleanser liquid is provided or considered.

SUMMARY OF THE INVENTION

The present invention has been made in view of the above-mentioned problems, and an object of the present invention is to provide an improved alternator, in which cooling efficiency is improved and a countermeasure against water is provided.

The alternator for use in an automotive vehicle includes a rotor and a stator contained in a housing composed of a front frame and the rear frame. A rectifier is mounted on a rear surface of the rear frame and covered with a rear cover connected to the housing. The rectifier includes a plus heatsink plate on which plus rectifier elements such as diodes are mounted and a minus heatsink plate on which minus rectifier elements are mounted. Both heatsink plates constitute a two-story structure, and the minus heat sink plate is disposed to face the rear surface of the rear frame and the plus heatsink plate is disposed to face the rear end of the rear cover.

The rear cover has axial openings open in the axial direction and radial openings open in the radial direction. The minus heatsink plate includes cooling fins extending in the axial direction and facing the radial openings of the rear cover. Also, an air passage is formed between the minus heatsink plate and the rear surface of the rear frame.

When a cooling fan connected to the rotor rotates, cooling air is introduced into the space between the rear frame and the rear cover where the rectifier is disposed. The cooling air introduced from the radial openings flows through radial passages between the cooling fins and through the air passage between the minus heatsink plate and the rear frame. Thus, the minus heatsink plate is effectively cooled from both surfaces. On the other hand, the cooling air introduced from the axial openings cools the plus heatsink plate.

The cooling fins on the minus heatsink plate are disposed at a radial outside of an outer periphery of the plus heatsink plate. Therefore, the axial length of the rectifier in the two-story structure does not increase by forming the cooling fins on the minus heatsink plate. Outside water entered into the alternator is easily drained from the radial openings formed on the rear cover.

The air passage between the minus heatsink plate and the rear frame may be composed of plural ditches formed on the rear surface of the rear frame. The rear cover may be eliminated, and the rectifier may be contained in the rear housing and separated from the rotor by a separating wall. On the minus heatsink plate, additional cooling fins extending in an opposite direction of the cooling fins may be formed to further enhance the cooling efficiency. In this case the additional cooling fins are disposed in the air passage between the minus heatsink plate and the rear frame. Further, the cooling fins may be slanted toward a rotational direction of the rotor to obtain a smoother air flow or may be formed in a zigzag shape to increase an effective cooling area of the cooling fins.

According to the present invention, the rectifier is effectively cooled and water entered the alternator is easily drained. Other objects and features of the present invention will become more readily apparent from a better understanding of the preferred embodiments described below with reference to the following drawings.

DETAILED DESCRIPTION OF THE PREFERRED EMBODIMENTS

Figure 1:
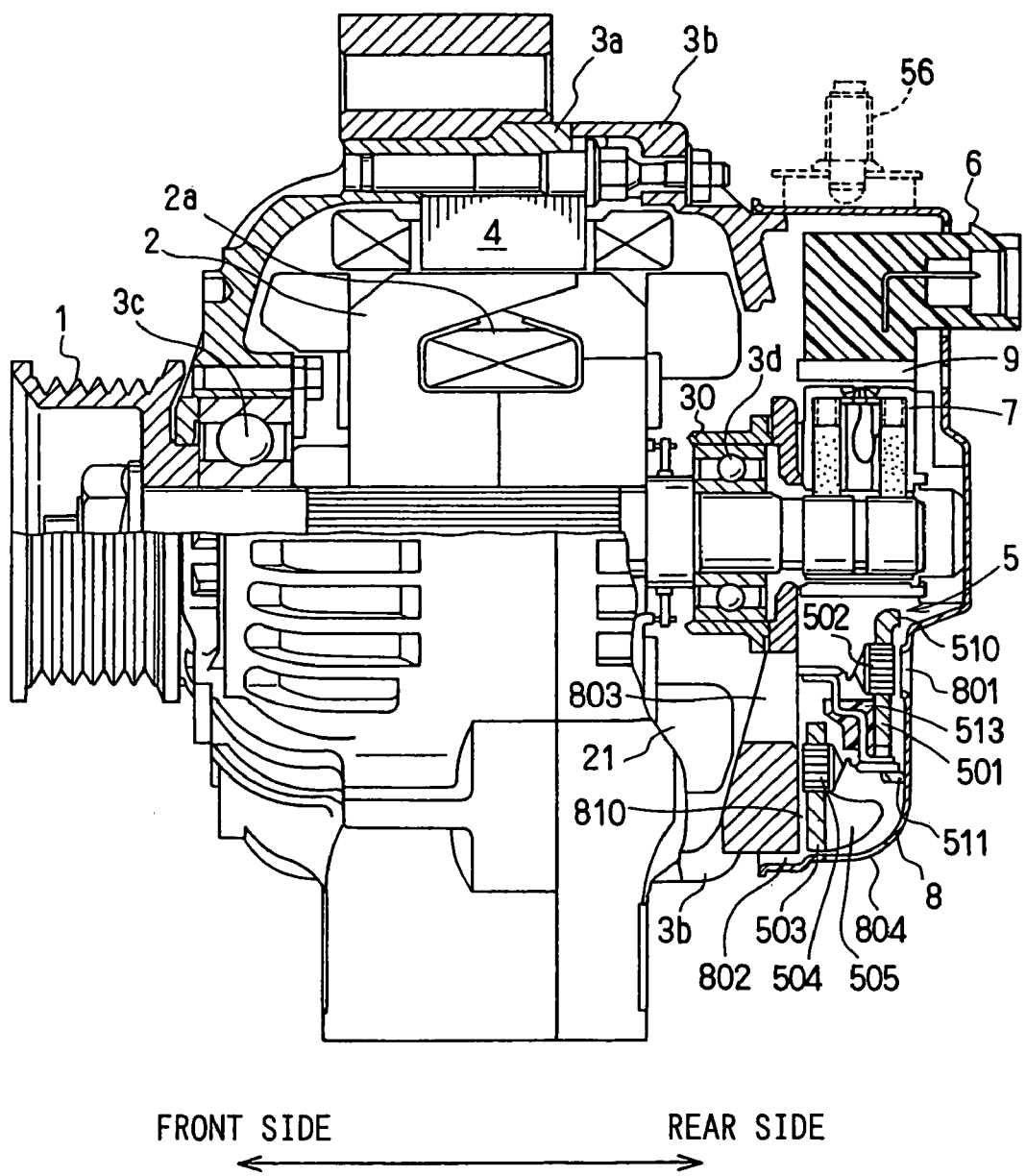
FIG. 1 is a cross-sectional view showing an alternator as a first embodiment of the present invention.

A first embodiment of the present invention will be described with reference to FIGS. 1–6. An alternator is composed of: a housing including a front frame 3a and a rear frame 3b (a front side and a rear side of the alternator are indicated in FIG. 1); a cylindrical stator 4 having an armature coil, the stator being contained in the housing; a rotor 2 having a field coil 2a, the rotor 2 being rotatably supported by bearings 3c, 3d inside the cylindrical stator 4; a pulley 1 connected to the rotor 2 for transmitting a rotational torque from an engine; a rectifier 5 for converting alternating current generated in the armature coil into direct current, the rectifier 5 being mounted on the rear frame 3b; a brush holder 7 holding brushes for supplying current to the field coil 2a; a regulator 9 for controlling an output voltage to a predetermined voltage; a connector case 6 for electrically connecting alternator to an outside circuit; a rear cover 8 made of resin for covering the rectifier 5, the regulator 9 and the brush holder 7; and other associated components.

Figure 3:
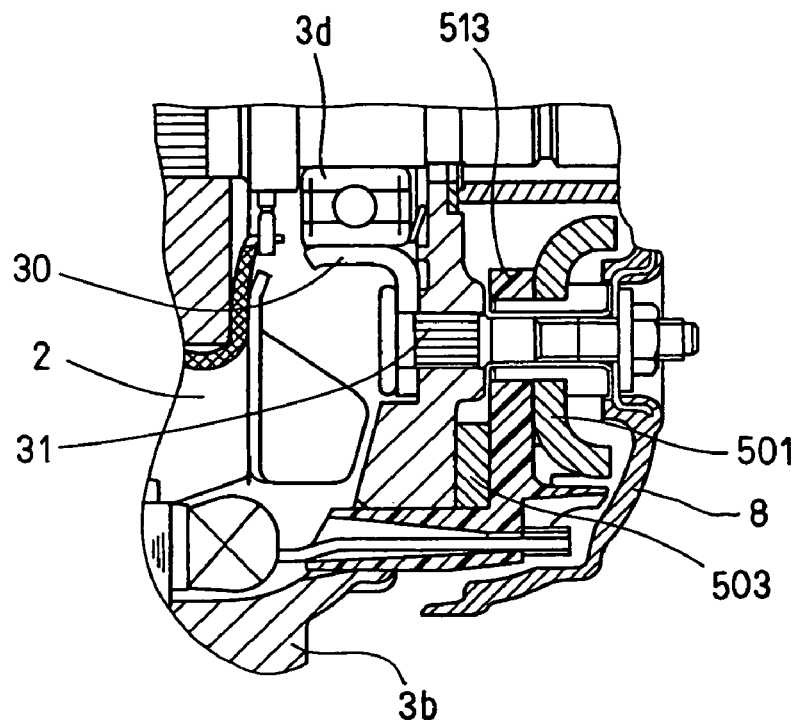
FIG. 3 is a partial cross-sectional view showing heatsink plates mounted on a rear frame.

The rectifier 5 includes a plus heatsink plate 501 on which plus diodes 502 (rectifier elements) are mounted, a minus heatsink plate 503 on which minus diodes 504 are mounted, and a terminal support 513. As shown in FIGS. 1 and 3, the terminal support 513 made of an insulating resin material includes conductors for leading alternating current generated in the stator 4 to the diodes 502, 504. The plus heatsink plate 501 and the minus heatsink plate 503 form a two-story structure by overlapping them with the terminal support 513 interposed therebetween. A lead terminal of each plus diode 502 extends toward the minus heatsink plate 503 while a lead terminal of each minus diode 504 extends toward the plus heatsink plate 501, as shown in FIG. 1. The diodes 502, 504 are mounted on the respective heatsink plates 501, 503 by press-fitting.

Figure 2:
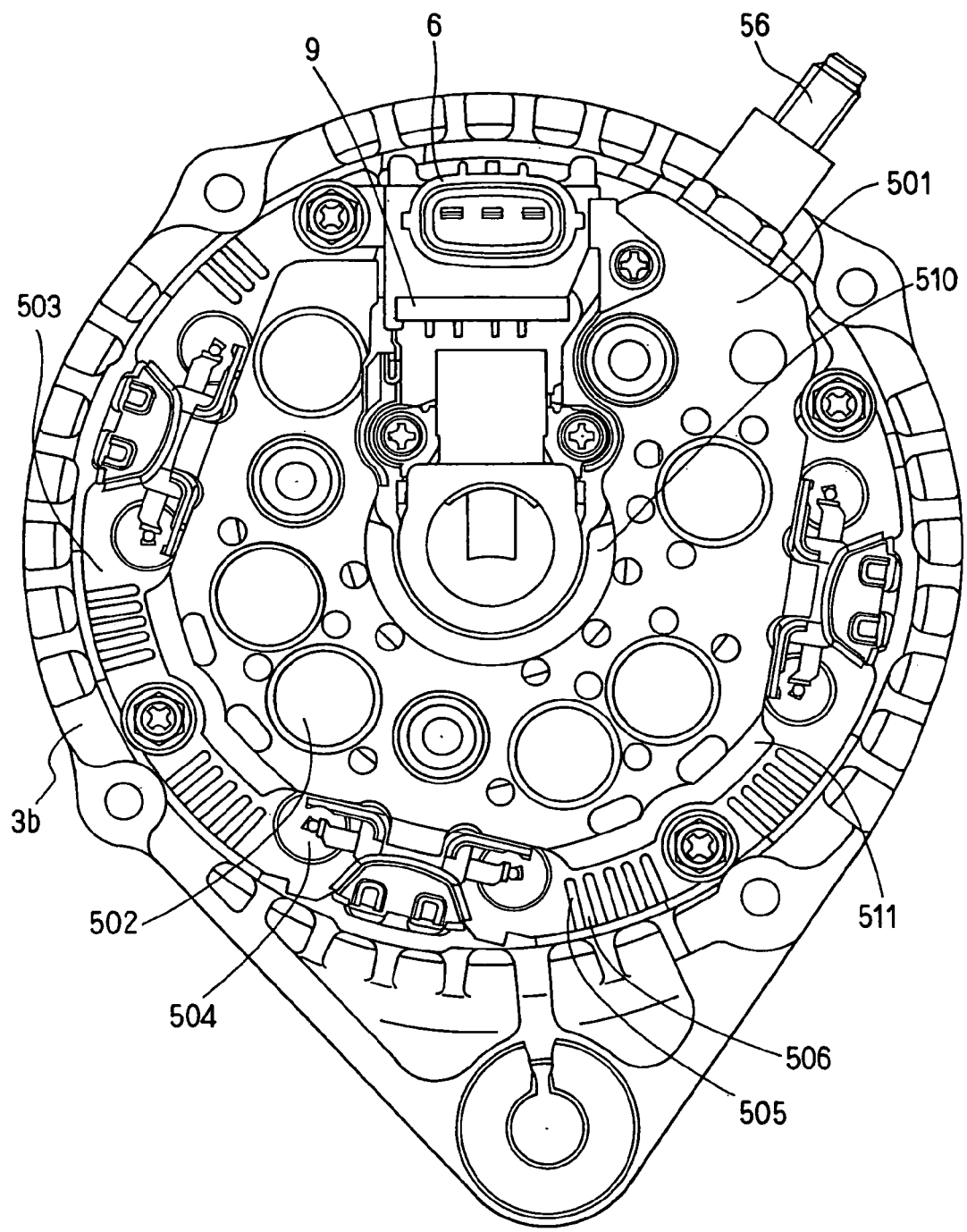
FIG. 2 is a plan view of the alternator viewed from its rear side with a rear cover removed.

The lead terminals of the diodes 502, 504 are electrically connected to conductors in the terminal support 513, thereby forming a full-wave rectifier circuit. In this particular embodiment, as shown in FIG. 2, six diodes are mounted on each heatsink plate 501, 503, so that two pairs of full-wave three-phase rectifier circuits are formed. As shown in FIG. 2, an output bolt 56 is connected to the plus heatsink plate 501, and direct current rectified by the rectifier 5 is led out from the output bolt 56.

As shown in FIG. 3, the rectifier 5 is disposed in a space between the rear frame 3b and the rear cover 8 and fixedly connected to the rear frame 3b together with the rear cover 8 by means of a bolt 31. The rear bearing 3d is supported in a bearing box 30. As shown in FIG. 2, an outer periphery of the minus heatsink plate 503 is made larger than an outer periphery of the plus heatsink plate 501, and the minus diodes 504 mounted on the minus heatsink plate 503 are positioned outside the plus diodes 502 mounted on the plus heatsink plate 501.

Axial openings 801 (shown in FIG. 5) are formed on the rear cover 8 so that the axial openings 801 face the plus diodes 502 mounted on the plus heatsink plate 501. As shown in FIGS. 1 and 2, a rib 510 is formed at an inner periphery of the plus heatsink plate 501 and another rib 511 at its outer periphery. The ribs 510, 511 are bent from the plus heatsink plate 501 toward the rear side of the alternator. Cooling air introduced into the alternator from the axial openings 801, guided by the ribs 510, 511, flows around the plus diodes 502 that generate heat. The plus diodes 502 are effectively cooled by the cooling air introduced from the axial openings 801. In addition, the ribs 510, 511 increase a heat dissipating area of the plus heatsink plate 501.

Figure 4:
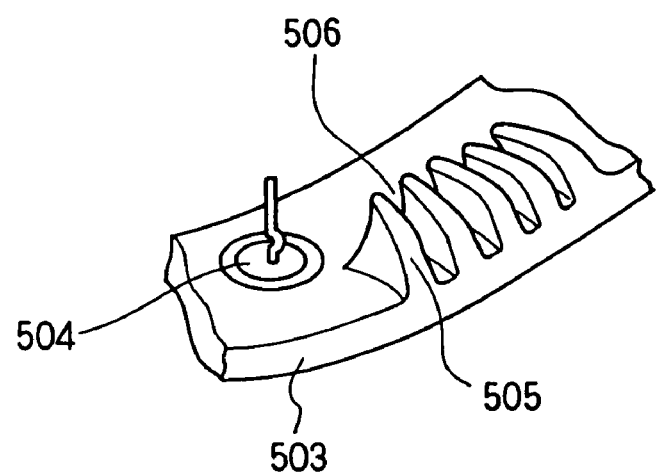
FIG. 4 is a partial perspective view showing a minus heatsink plate having cooling fins.
Figure 5:
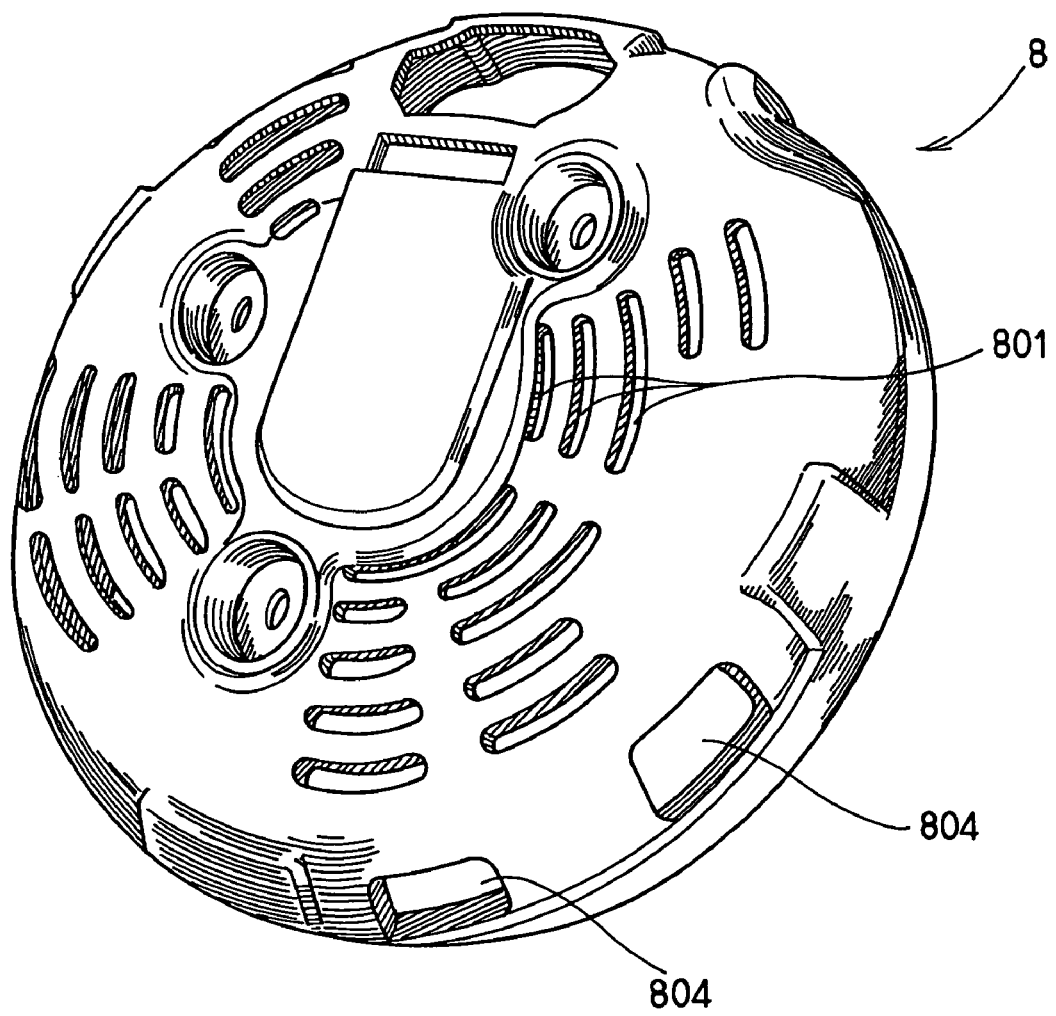
FIG. 5 is a perspective view showing a rear cover of the alternator.
Figure 6:
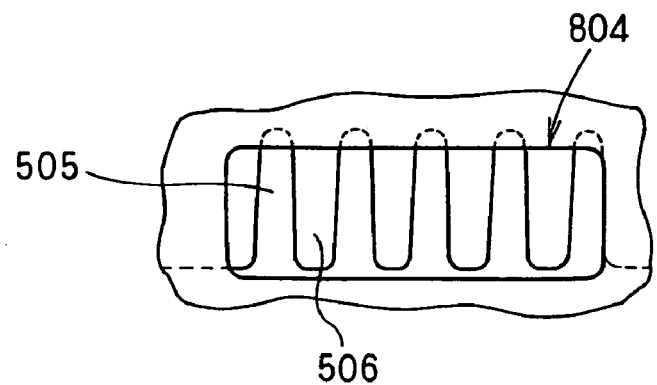
FIG. 6 is a partial plan view showing the cooling fins formed on the minus heatsink plate, viewed from an axial direction of the alternator through a radial opening formed on the rear cover.

Cooling fins 505 standing from the minus heatsink plate 503 in the axial direction are formed at its several outer peripheral positions, as shown in FIG. 2. The cooling fins 505 may be integrally formed with the minus heatsink plate 503 by die-casting. Radial openings 804 (shown in FIG. 5) are formed on the rear cover 8 so that the radial openings 804 face the cooling fins 505. As shown in FIG. 4, a radial air passage 506 is formed between neighboring cooling fins 505. A height of the cooling fin 505 (a dimension in the axial direction) is made equal to or larger than a width of the radial openings 804 (a dimension seen in the radial direction), as shown in FIG. 6. The cooling fins 505 prevent foreign particles from entering into the alternator from the radial openings 804.

As shown in FIG. 3, the minus heatsink plate 503 contacts the rear frame 3b at positions where the minus heatsink plate is connected to the rear frame 3b. However, an air passage 810 is formed between the minus heatsink plate 503 and the rear frame 3b, as shown in FIG. 1. A radial air gap 802 between the rear frame 3b and the rear cover 8 communicates with an air inlet 803 of the rear frame 3b through the air passage 810.

When the cooling fan 21 rotates, cooling air is introduced from the radial openings 804 facing the cooling fins 505. The cooling air flows along a rear surface of the minus heatsink plate 503 and is sucked into the inner space through the air inlet 803 of the rear frame 503. At the same time, cooling air is introduced also from the radial air gap 802. The cooling air introduced from the radial air gap 802 flows through the air passage 810 along a front surface of the minus heatsink plate 503 and is sucked into the inner space through the air inlet 803. In other words, the minus heatsink plate 503 is cooled from its both surfaces. In addition, the cooling fins 505 increases a total heat-dissipating area of the minus heatsink plate 503. Therefore, the minus diodes 504 mounted on the minus heatsink plate 503 are effectively cooled.

Since the radial openings 804 for introducing the cooling air to be supplied to the minus heatsink plate 503 are formed on the radial side of the rear cover 8, water or cleanser liquid entered into the alternator does not retained therein but it easily drains from the radial openings 804 by the gravity. Since the height of the cooling fins 505 is made to sufficiently cover the width of the radial openings 804, foreign particles are prevented from entering into the alternator. Further, since the minus diodes 504 are positioned outside the outer periphery of the plus heatsink plate 501 (better seen in FIG. 2), a height of rectifier in the axial direction can be minimized.

Figure 7:
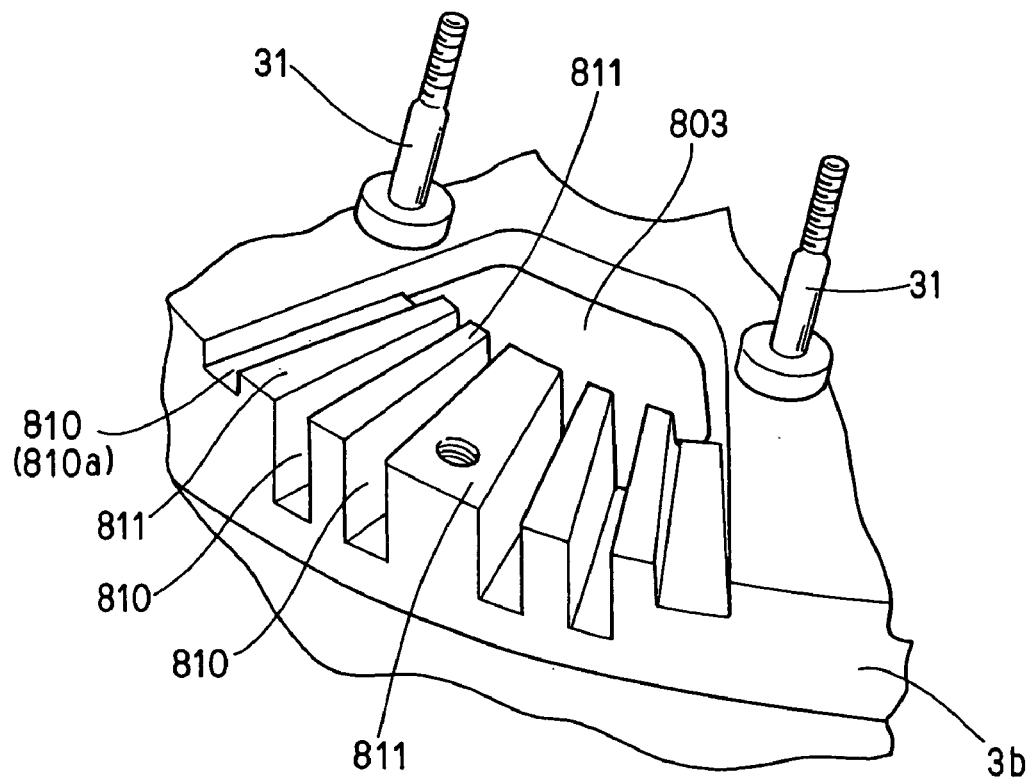
FIG. 7 is a perspective view showing a portion of a rear frame on which air passages are formed, as a second embodiment of the present invention.

A second embodiment of the present invention will be described with reference to FIG. 7. The air passage 810 leading the cooling air from the radial air gap 802 to the air inlet 803 may be constituted as shown in FIG. 7. Plural ditches forming the air passage 810 and plural projected surfaces 811 contacting the minus heatsink plate 503 are alternately formed on the rear frame 3b. The ditches and the projected surfaces are formed along radial lines converging to the center of the alternator. An air passage 810a facing a back surface of the minus diode 504 mounted on the minus heatsink plate 503 may be made shallower than other air passages 810, as shown in FIG. 7. In addition to making a direct contact between the projected surfaces 811 and the minus heatsink plate 503, a heat-conductive material such as heat-conductive grease may be placed therebetween. The plural projected portions forming the projected surfaces 811 also function as additional cooling fins. By constituting the air passage 810 in the manner described above, the minus diodes 504 mounted on the minus heatsink plate 503 are further effectively cooled.

Figure 8:
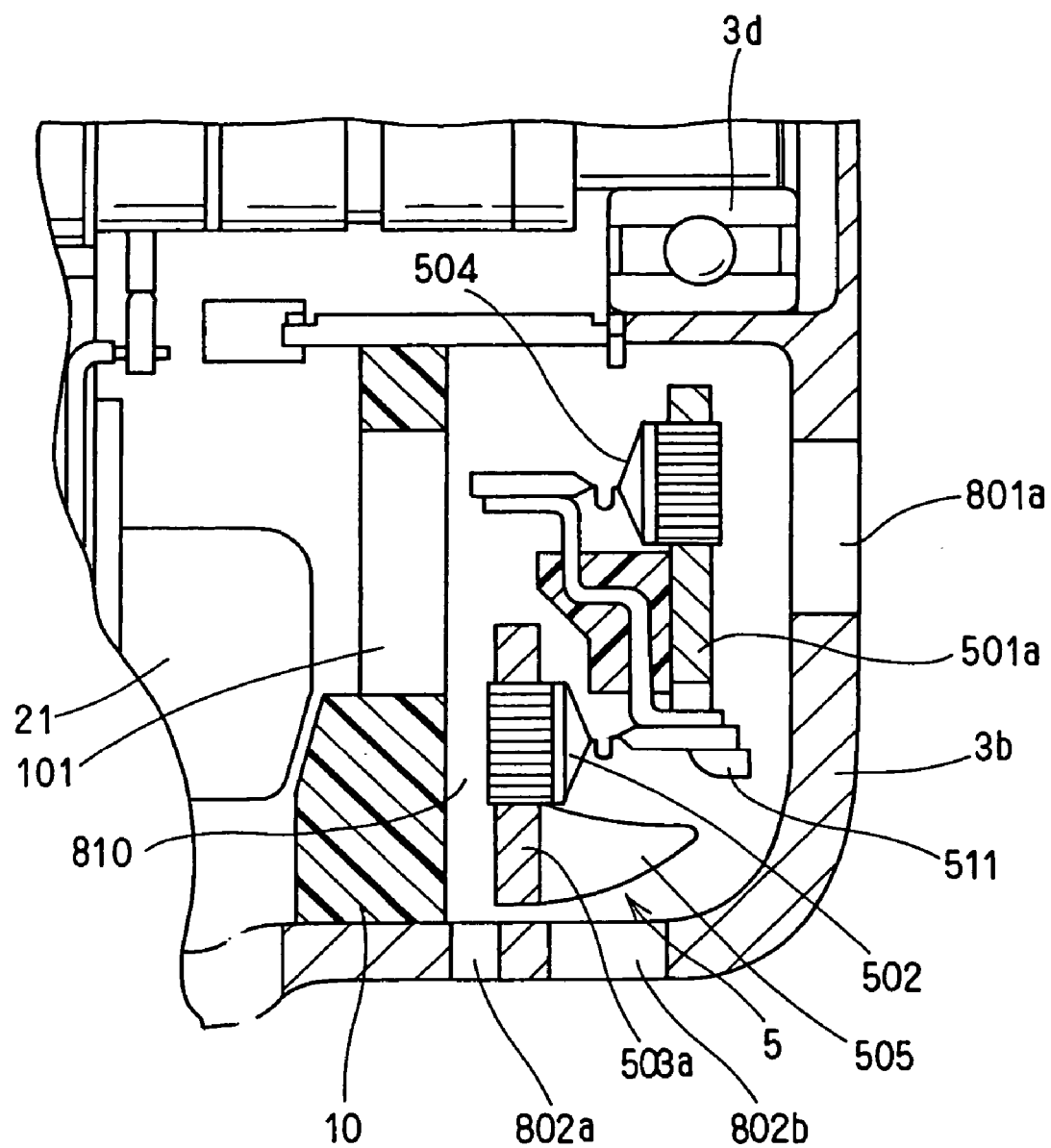
FIG. 8 is a partial cross-sectional view showing an alternator as a third embodiment of the present invention.
Figure 9:
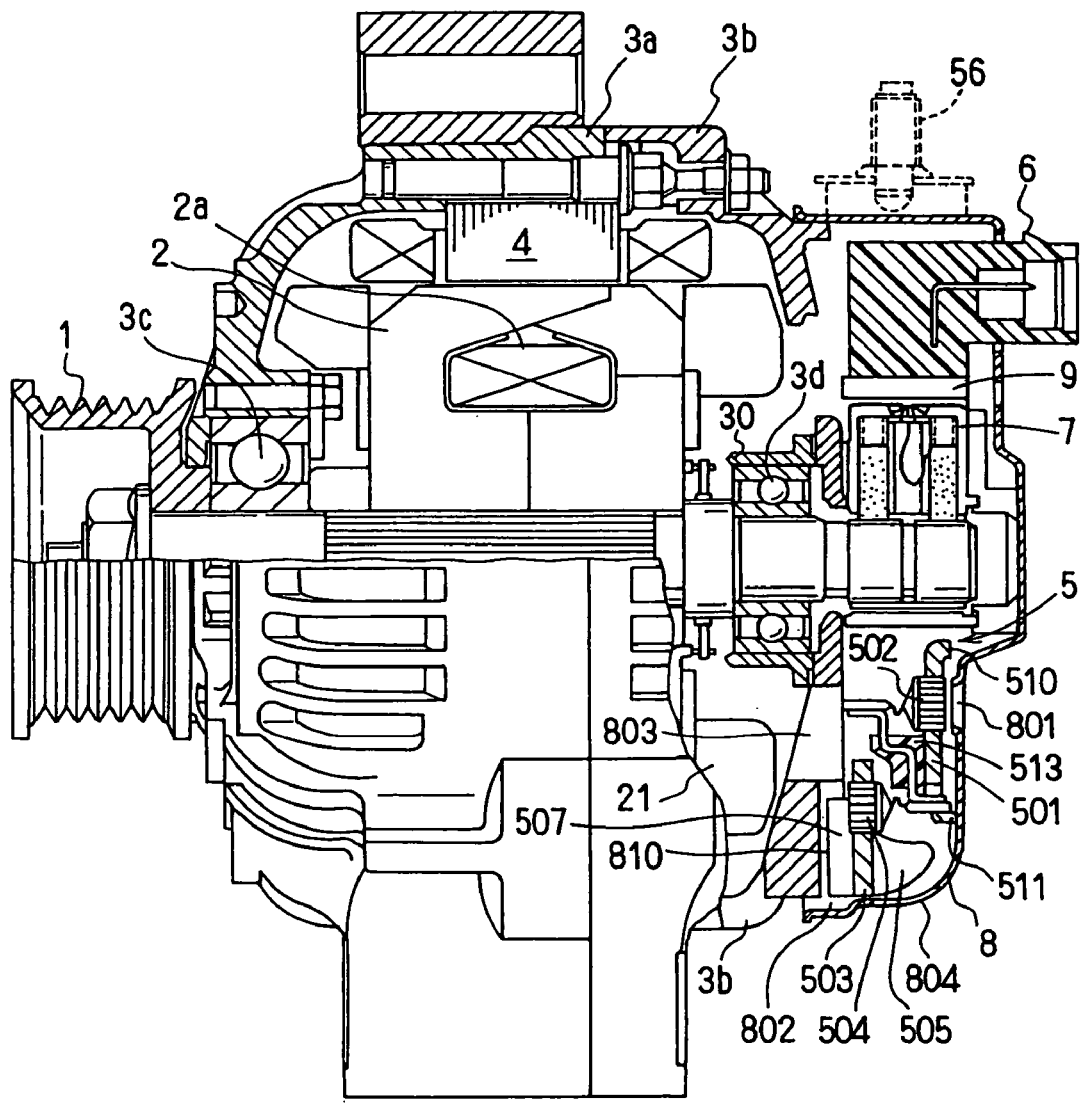
FIG. 9 is a cross-sectional view showing an alternator as a fourth embodiment of the present invention.
Figure 10:
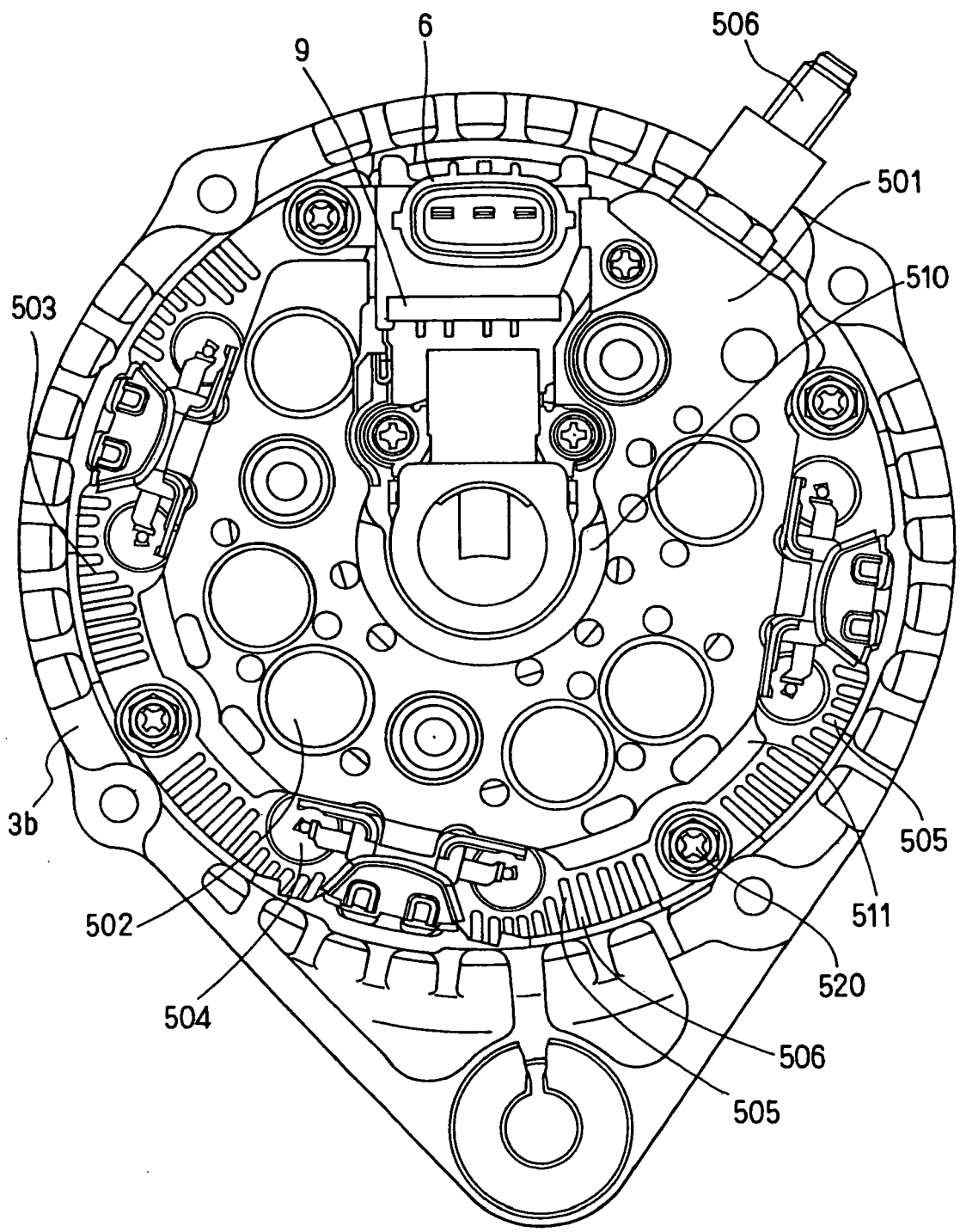
FIG. 10 is a plan view of the alternator shown in FIG. 9, viewed from its rear side with a rear cover removed.

A third embodiment of the present invention will be described with reference to FIG. 8. In this embodiment, the rear cover 8 is eliminated, and the rear bearing 3d is disposed on the rear most end of the rear frame 3b. The rectifier 5 is disposed in a space between the rear frame 3b and a separating wall 10. Axial openings 801a are formed on the axial end wall of the rear frame 3b, and radial openings 802a, 802b are formed on the radial wall of the rear frame 3b.

The rectifier 5 includes an outer heatsink plate 503a on which the plus diodes 502 are mounted and an inner heatsink plate 501a on which the minus diodes 504 are mounted. When the cooling fan 21 is rotated, cooling air introduced from the axial openings 801a is sucked into an air inlet port 101 formed on the separating wall 10 after cooling the inner heatsink plate 501a. Cooling air introduced from the radial openings 802b passes through the cooling fins 505 formed on the outer heatsink plate 503a and flows into the inner space through the air inlet port 101. Cooling air introduced from the other radial openings 802a flows through the air passage 810 between the outer heatsink plate 503a and the separating wall 10 and is sucked in the inner space through the air inlet port 101.

The outer heatsink plate 503a is cooled from its both surfaces in the similar manner as in the first embodiment. Therefore, the rectifier 5 is effectively cooled. The heatsink plates 501a, 503a for mounting respective diodes 504, 503 may be reversed, i.e., the minus diodes 504 may be mounted on the outer heatsink plate 503a and the plus diodes 502 on the inner heatsink plate 501a. The radial openings 802a and 802b positioned close to each other may be combined to form a single opening.

Figure 11:
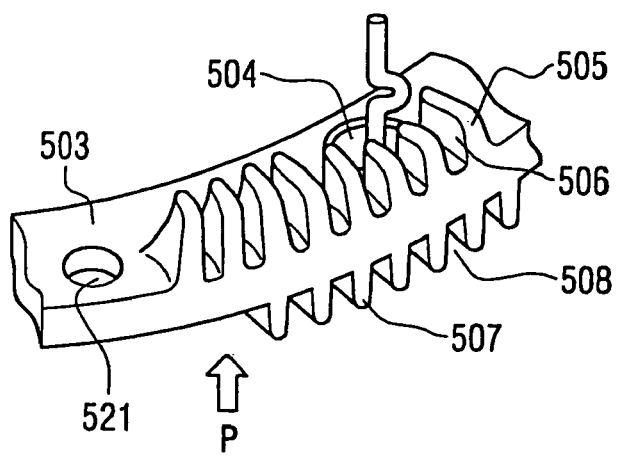
FIG. 11 is a partial perspective view showing a minus heatsink plate used in the alternator shown in FIG. 9.
Figure 12:
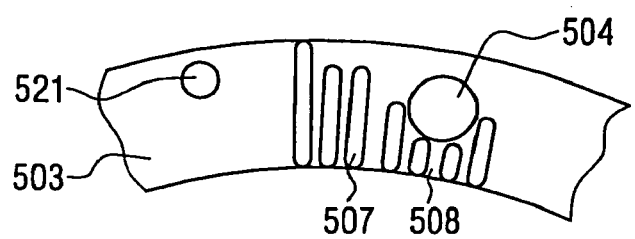
FIG. 12 is a partial plan view showing the minus heatsink plate shown in FIG. 11, viewed in direction P indicated in FIG. 11.

A fourth embodiment of the present invention will be described with reference to FIGS. 9–12. In this embodiment, second cooling fins 507 are additionally formed on the minus heatsink plate 503, so that the second cooling fins 507 are positioned in the air passage 810. Other structures are the same as those in the first embodiment. As shown in FIGS. 11 and 12, the second cooling fins 507 are formed on the surface opposite to the surface where the cooling fins 505 are formed. Radial air passages 508 are formed between neighboring second cooling fins 507. The second cooling fins 507 are formed in parallel to one another, so that air flow resistance does not change throughout the radial passages 508. The minus heatsink plate 503 having cooling fins 505, 507 on both surfaces may be integrally made by die-casting, or the respective fins may be connected to the heatsink plate by welding or the like.

A total heat-dissipating area of the minus heatsink plate 503 is increased by making the second cooling fins 507. Since the second cooling fins 507 are positioned in the air passage 810 between the rear frame 3b and the minus heatsink plate 503, the minus heatsink plate 503 is further effectively cooled. Since the second cooling fins 507 are made in parallel to one another, a flow resistance does not change in the air passage 810. Accordingly, the cooling air can smoothly flow through the air passage 810.

The minus heatsink plate 503 is mounted on the rear frame 3b using mounting holes 521, and the second cooling fins 507 are positioned between the mounting hole 521 and the minus diode 504 as shown in FIGS. 11 and 12. Heat from the stator 4 is transferred to the minus diode 504 through the rear frame 3b and the minus heatsink plate 503. However, the second cooling fins 507 positioned between the mounting hole 521 and the minus diode 504 suppress such heat transfer. Therefore, a temperature rise in the minus diode 504 is suppressed. Since the minus diodes 504 are positioned outside the outer periphery of the plus heatsink plate 501 in the same manner as in the first embodiment, the axial length of the rectifier 5 in the two-story structure is minimized.

Figure 13:
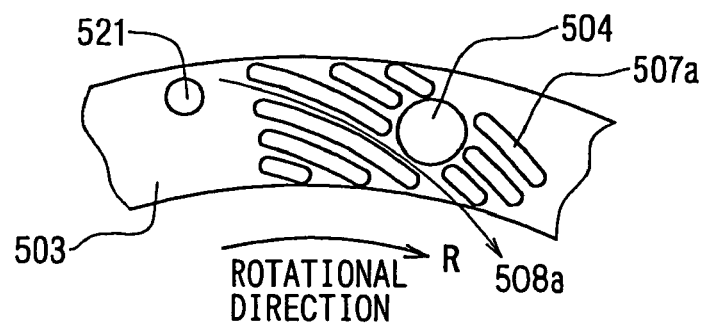
FIG. 13 is a partial plan view showing a modified form of the minus heatsink plate shown in FIG. 12.
Figure 14:
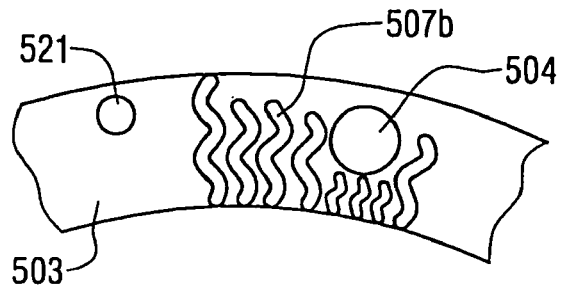
FIG. 14 is a partial plan view showing another modified form of the minus heatsink plate shown in FIG. 12.

The second cooling fins 507 used in the fourth embodiment may be modified to a form shown in FIG. 13. Each second fin 507a is slanted toward a rotational direction of the rotor 2, as shown in FIG. 13. Since cooling air passages 508a are formed along a cooling air stream entering from the outer periphery of the minus heatsink plate 503, the flow resistance of the cooling air can be reduced, thereby further improving the cooling efficiency. The cooling fins 505 may be slanted in the same manner as the second cooling fins 507a. The second cooling fin 507 shown in FIG. 12 may be modified to a second cooling fin 507b shown in FIG. 14. Each second fin 507b is formed in a zigzag shape to thereby increase its effective cooling area. The cooling fin 505 may be modified in the similar manner.

Figure 15:
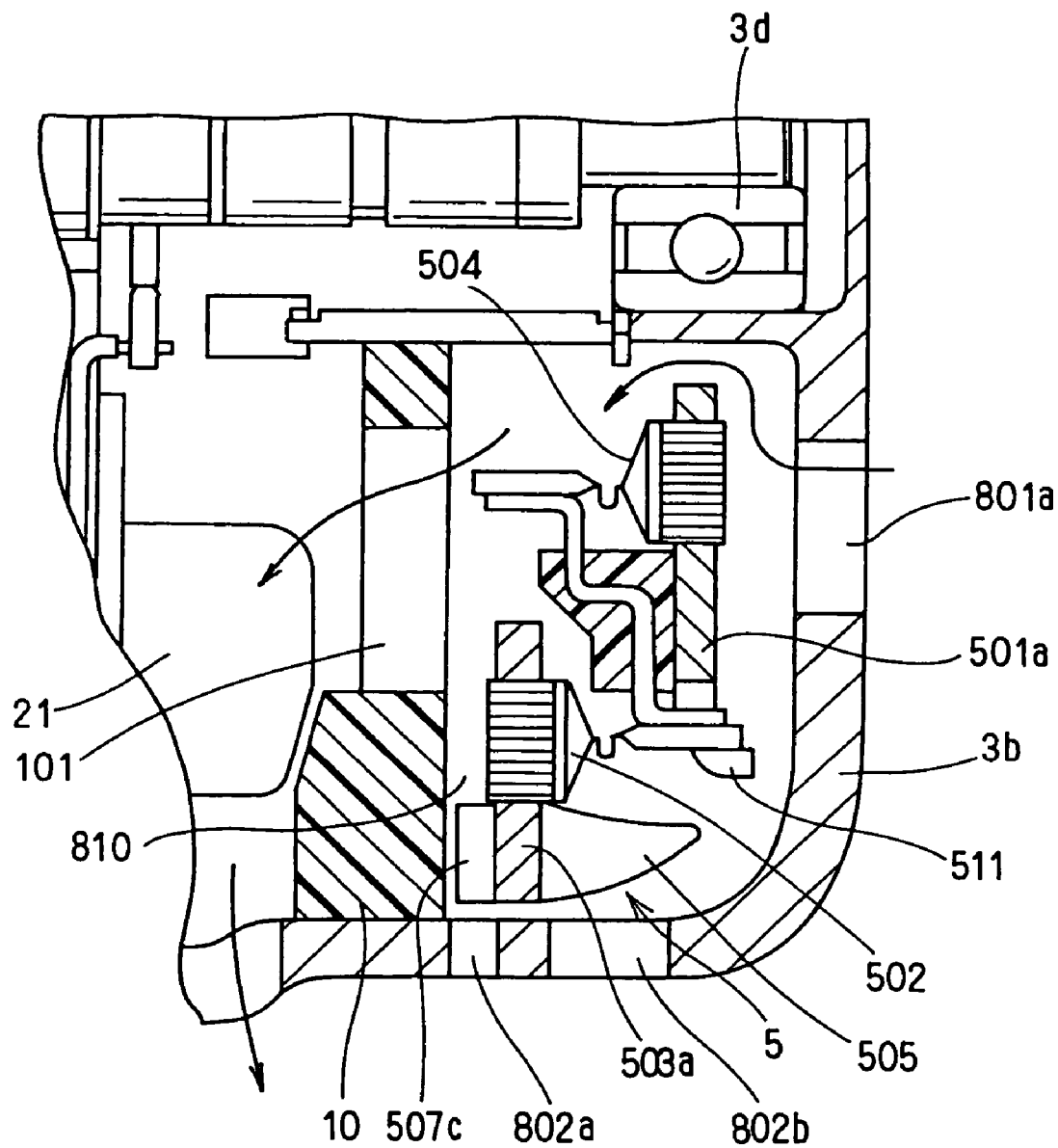
FIG. 15 is a partial cross-sectional view showing an alternator as a fifth embodiment of the present invention.

A fifth embodiment of the present invention is shown in FIG. 15. In this embodiment, a second cooling fin 507c is formed on the outer heatsink plate 503a, so that the second cooling fin 507c is positioned in the air passage 810. Other structures are the same as those of the third embodiment shown in FIG. 8. The second cooling fin 507c is similar to the second cooling fin 507 used in the fourth embodiment shown in FIG. 9. The outer heatsink plate 503a is effectively cooled by both cooling fins 505 and 507c formed on its both surfaces, respectively.

The present invention is not limited to the embodiments describe above, but it may be variously modified. For example, the number of the rectifier circuits is not limited to two. In the foregoing embodiments, two pairs of full-wave three-phase rectifier circuits are formed, but only a single rectifier circuit may be formed, or three or more pairs may be made. Though the diode is mounted on the heatsink plate by press-fitting in the foregoing embodiment, the diode may be connected to the heatsink plate by soldering. Though the rear cover is made of a resin material in the foregoing embodiment, it may be made of a metallic plate to thereby utilize the rear cover itself as a heat-dissipating plate.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An alternator for use in an automotive vehicle, the alternator comprising:

a housing including a front frame and a rear frame;

a cylindrical stator including an armature coil, the cylindrical stator being contained in the housing;

a rotor rotatably disposed inside the cylindrical stator and supported in the housing;

a rectifier mounted on and contained in the housing;

a separating wall separating the rectifier from the rotor in the axial direction; and a cooling fan for sucking cooling air through air inlets formed on the separating wall after cooling the rectifier, the cooling fan being connected to the rotor, wherein:

the rectifier includes an outer heatsink plate on which rectifier elements are mounted and an inner heatsink plate on which other rectifier elements are mounted, the outer heatsink plate being disposed to face the separating wall forming an air passage therebetween, the inner heatsink plate being disposed to face the rear frame;

the outer heatsink plate includes cooling fins extending toward the rear frame in the axial direction and forming radial air passages between the cooling fins; and the rear frame includes radial openings that are open in a radial direction of the rotor, so that the cooling air is introduced from the radial openings upon rotation of the cooling fan and flows through the radial air passages between the cooling fins and through the air passage between the outer heatsink plate and the separating wall.

2. The alternator for use in an automotive vehicle as in claim 1, wherein:

the radial passages formed between the cooling fins are arranged along radial lines converging to a center of the rotor.

3. The alternator for use in an automotive vehicle as in claim 1, wherein:

the cooling fins are positioned radially outside of an outer periphery of the inner heatsink plate.

4. The alternator for use in an automotive vehicle as in claim 1, wherein:

the air passage between the outer heatsink plate and the separating wall communicates with the air inlets formed on the separating wall.

5. An alternator for use in an automotive vehicle, the alternator comprising:

a housing including a front frame and a rear frame;

a cylindrical stator including an armature coil, the cylindrical stator being contained in the housing;

a rotor rotatably disposed inside the cylindrical stator and supported in the housing;

a rectifier mounted on and contained in the housing;

a separating wall separating the rectifier from the rotor in the axial direction; and a cooling fan for sucking cooling air through air inlets formed on the separating wall after cooling the rectifier, the cooling fan being connected to the rotor, wherein:

the rectifier includes an outer heatsink plate on which rectifier elements are mounted and an inner heatsink plate on which other rectifier elements are mounted, the outer heatsink plate being disposed to face the separating wall forming an air passage therebetween, the inner heatsink plate being disposed to face the rear frame;

the outer heatsink plate includes cooling fins standing from the outer heatsink plate toward the rear frame in the axial direction and forming radial air passages between the cooling fins;

the outer heatsink plate further includes second cooling fins standing from the outer heatsink plate and extending into the air passage between the outer heatsink plate and the separating wall; and the rear frame includes radial openings that are open in a radial direction of the rotor, so that the cooling air is introduced from the radial openings upon rotation of the cooling fan and flows through the radial air passages between the cooling fins and through the air passage between the outer heatsink plate and the separating wall.

6. The alternator for use in an automotive vehicle as in claim 5, wherein:

the radial passages formed between the cooling fins are arranged along radial lines converging to a center of the rotor.

7. The alternator for use in an automotive vehicle as in claim 5, wherein:

the cooling fins are positioned radially outside of an outer periphery of the inner heatsink plate.

8. The alternator for used in an automotive vehicle as in claim 5, wherein:

the radial openings formed on the rear frame communicate with the air inlets formed on the separating wall through the air passage between the outer heatsink plate and the separating wall.

* * * * *